United States Patent [19]

Santiago

[11] 4,180,544
[45] Dec. 25, 1979

[54] CATALYTIC CONVERTER HAVING MONOLITH MOUNTING MEANS THEREIN

[75] Inventor: Enrique Santiago, Diedorf, Fed. Rep. of Germany

[73] Assignee: Zeuna-Stärker GmbH & Co. KG, Augsburg, Fed. Rep. of Germany

[21] Appl. No.: 909,446

[22] Filed: May 25, 1978

[30] Foreign Application Priority Data

May 25, 1977 [DE] Fed. Rep. of Germany ....... 2723532

[51] Int. Cl.² .......................... F01N 3/15; F01N 7/18
[52] U.S. Cl. .................................. 422/179; 422/180; 60/299; 29/157 R
[58] Field of Search ................... 23/288 FC; 422/179, 422/180; 60/299; 29/157 R, 445; 423/213.2

[56] References Cited

U.S. PATENT DOCUMENTS

| 3,841,839 | 10/1974 | Wiley | 23/288 FC |
| 3,975,826 | 8/1976 | Balluff | 23/288 FC |
| 3,990,859 | 11/1976 | Waite | 23/288 FC |
| 4,039,291 | 8/1977 | Hergoualch et al. | 23/288 FC |

FOREIGN PATENT DOCUMENTS

| 2046125 | 4/1971 | Fed. Rep. of Germany . |
| 2311812 | 9/1973 | Fed. Rep. of Germany . |
| 2417554 | 10/1974 | Fed. Rep. of Germany ...... 23/288 FC |
| 2341265 | 3/1975 | Fed. Rep. of Germany ...... 23/288 FC |
| 2635725 | 3/1977 | Fed. Rep. of Germany . |

*Primary Examiner*—Joseph Scovronek
*Assistant Examiner*—Bradley Garris
*Attorney, Agent, or Firm*—Cushman, Darby & Cushman

[57] ABSTRACT

A sheet metal housing for a metal monolithic body for an automobile. Noses are impressed in the sheet metal to engage the facing ends of the monolithic catalyst body.

2 Claims, 3 Drawing Figures

CATALYTIC CONVERTER HAVING MONOLITH MOUNTING MEANS THEREIN

The present invention relates to a device for the detoxification of the exhaust gases of combustion engines in motor vehicles by means of a metallic catalyst body, enclosed in shock-resistant manner in the interior of a housing which permits uni-directional flow through itself and through the enclosed catalyst body. The catalyst body has a circumferential or peripheral surface which extends parallel to the flow direction of the catalyst unit, against which the housing rests. On each end face of the catalyst body, there is provided, on the side of the housing, at least one nose that projects axially inwardly, resting against the facing end of the catalyst body.

In a similar, known device (German Patent Disclosure No. 2,635,725), each ring shaped support part is provided for the purpose of axial support of the catalyst body's front surfaces, which rest against the circumferential edges of the catalyst body. On one of the two support parts, diametrically opposed noses are provided that project radially inwardly which form a slit between their free ends. The head resistance of the catalyst body is increased by such noses; in addition, the cross section of the flow is considerably reduced. Even if the noses rest tightly against the front surface of the catalyst body prior to the use of the device, one must anticipate a bending of the noses after a period of use, based upon the existing high thermal stress, resulting in the likelihood that the axial support of the catalyst body is no longer assured. With an increasing axial movement of the catalyst body, increased axial impact forces will result, resulting in a risk of premature destruction of the device.

In a poured-bed catalyst (German Patent Disclosure No. 2,046,125), it is known to support the cage that holds the grainy catalyst material in the interior of a sheet-metal housing between projections that point towards the interior. These projections provide sideways support of the cage that is rigidly connected in axial direction with the sheet-metal housing.

Finally, it is known (German Patent Disclosure No. 2,311,812), to support the catalyst body by means of a shock-damping covering against a housing, whereby the axial support of the catalyst body is effected by a circumferential indentation in the housing in the region of the circumferential edges of the catalyst body. In order to avoid damage to the catalyst body, this form of embedment in the interior of a housing requires maintenance of narrow production tolerances.

In contrast to this, the present invention has as its object a new, simple method of axial support of the catalyst body that nevertheless is economical in respect of flow losses and efficient from the standpoint of shock reduction, that is adaptable to assembling the housing by both the half-shell and tube construction methods.

In order to achieve these objectives, it is important to provide the following characteristics:

(a) the housing is a sheet-metal housing in which the noses are formed as impressions or deformations of the housing itself;

(b) the noses extend themselves only in the vicinity of the circumferential edges of the monolithic catalyst body and project axially against the facing ends of the catalyst body so that their peaks rest against the facing ends;

(c) each impression that forms a nose is shaped in such a manner that the housing wall opposite to the circumferential surface of the catalyst body is also slightly extended.

Impressions for the sheet-metal housing according to characteristic (a) are simply produced in mechanical manner; they produce an effective support without markedly reducing the exposed area of the facing end surface of the catalyst body; the flow losses which occur are correspondingly low. Since the noses can be produced, optionally, prior to or after installation, they are equally suitable to use in half-shell or in tube construction. In the case of formation of the noses after the housing is assembled, the additional advantage results, that, in this manner, production tolerances in respect of the axial length of the catalyst body can be adjusted.

For the twin-shell construction method, it is especially useful that the noses of each half-shell be preformed and are brought into their final shape to rest against the front side of the catalyst body only after assembly.

In the process of forming the impression, it is necessary to see to it that the housing wall in the area of the circumferential edges of the catalyst body is expanded slightly not only opposite to the facing ends of the catalyst body, but also opposite to its circumferential surface. Along with the protection of the catalyst body, this also results in a spring effect of the noses, between which the catalyst body is solidly tensioned even under the influence of heat expansion. Added to this is the fact that, in the case of heat expansions, an elongation of the housing in the axial direction in relation to the catalyst body, is compensated by a corresponding extension of the noses that project axially inwardly.

Within the framework of the invention, the application of the impressions that form the noses is simplified by using a sheet-metal housing whose cylindrical part, which abuts the circumference of the catalyst body, is slightly longer than the axial length of the catalyst body. Upon impressing the nose, therefore, there is formed a nose that has a spring-action radially, in reference to the remaining circumferential surface and which is raised with its head against the front surface of the catalyst body.

In the case that the housing is produced according to a preferred embodiment, in which the housing is in the shape of two half-shells, and each half-shell exhibits two opposing noses in the crown area in its final condition, it is advantageous, as an assembly method, first to provide the two half-shells with pre-impressed noses, then to place the two half-shells over the catalyst body, to weld them along their circumferential flange and, only then, to complete the impression of the noses.

A suitable raw material for the sheet-metal housing is a ferrite (soft pure iron) steel sheet that has a small coefficient of expansion, rather than sheets of austenitic steel. The catalyst carrier, preferably, consists of a spirally-coiled steel sheet of a heat-resistant steel alloy with alloy components of chromium, aluminum and Yttrium.

The following describes an embodiment of the invention on the basis of the drawing, in which.

Figure 1:
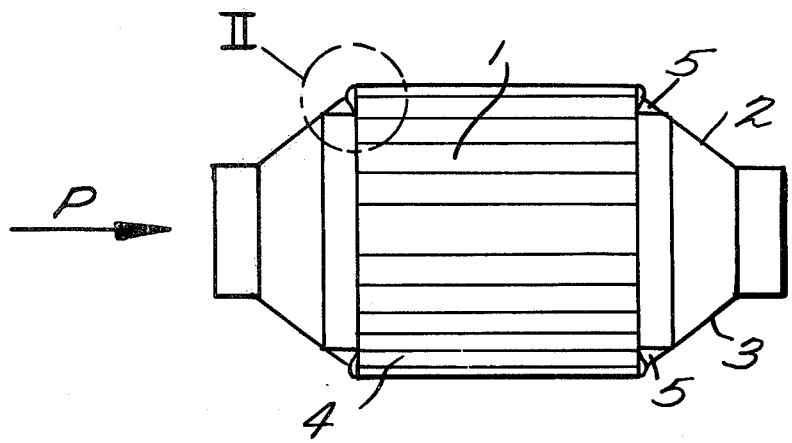
FIG. 1 represents a cross section through the catalyst arrangement, along lines 1, 1 of FIG. 3.

The catalyst unit according to the invention comprises a ferrite-sheet housing which encloses a catalyst body 1. The housing consists of substantially identical upper and lower half-shells 2 and 3 which are joined together. Along the joint between the half-shells, they have flanges 2a and 3a respectively which extend laterally outwardly and abut each other; the flanges are connected to each other by welding. The housing formed by assembling the half shells has a cylindrical center portion which has the largest diameter and cylindrical pipes at its ends which are suitable for connection to the exhaust pipe and tail pipe of an automobile. The center portions and the cylindrical pipes are joined by conical sections as shown in FIG. 1.

The catalyst body is cylindrical and about the same length as the cylindrical portion of the housing. It is comprised of a metallic carrier material which is oxidation resistant, even at high temperatures. It has numerous fine channels parallel to the flow direction which is the axial direction indicated by the arrow in FIG. 1. The channels may be provided with a catalytically active coating in known manner. The exterior surface of the catalyst body is sealed gas-tight.

The outer diameter of the catalyst body is about equal to the inner diameter of the center portion of the housing. Therefore, the peripheral surface of the catalyst abuts the inner surface of the housing without clearance, providing radial support for the catalyst body. For axial support and tensioning of the catalyst body, four noses 5 are formed in the conical portions of the housing, which project inwardly of the housing. Two of these are at the crown points of the upper half-shell, one at each end of the catalyst body, and two of them are at the crown point of the lower half-shell, one at each end of the catalyst body. The configuration of the noses is illustrated in enlarged scale in FIG. 2.

Figure 2:
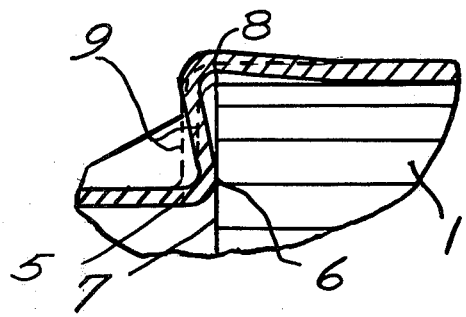
FIG. 2 is an enlarged representation of the portion of FIG. 1 indicated at II.
Figure 3:
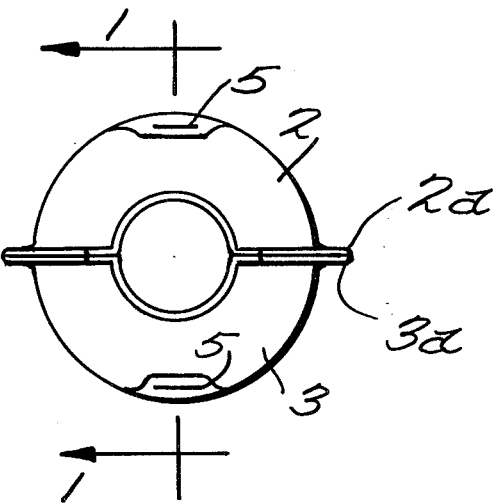
FIG. 3 is an end elevation of the catalyst unit.

In order to obtain the form of nose 5 which is illustrated in FIG. 2, the housing half-shells are preformed to the shape indicated by dot-dash lines in FIG. 2. In this shape, the axial distance between noses is greater than the length of the catalyst body. When the catalyst unit is assembled, after assembly of the two half-shells, the noses are deformed so that the nose 5 abuts the front surface 7 of the catalyst body 1, as shown by solid lines in FIG. 2. At the same time, a part of the cylindrical center portions of the catalyst body, adjacent both sides of the circumferential edges 8 of the catalyst body 1, is lifted off slightly from the catalyst body. In this manner the circumferential edges of the catalyst body are protected against damage during the assembly process and the step of deforming the noses.

What is claimed is:

1. A device for the detoxification of the exhaust gases of combustion engines in motor vehicles comprising a monolithic metallic catalyst body, and a housing enclosing said catalyst body in a shock-resistant manner in its interior, said housing and catalyst body permitting flow-through of exhaust gases in an axial direction, said catalyst body having a circumferential surface, parallel to said flow-through direction, and resting against the interior of said housing, and said housing having at least one nose projecting inwardly against each facing end of said catalyst body said device being characterized by the following characteristics:
   (a) the housing is a sheet-metal housing, in which said noses are formed as impressions in said sheet metal;
   (b) said noses extend only in the vicinity of the circumferential edges of the catalyst body and project, each, axially toward the appropriate facing end, so that their heads rests against said facing ends;
   (c) each impression that forms a nose is shaped in such a way, that the housing wall, opposed to the circumferential surface of the catalyst body is also slightly extended.

2. A device according to claim 1 in which said housing comprises two half-shells, the noses of each half-shell being preformed to their approximate final shape and being final-formed to their resting points against the facing ends of the catalyst body only after assembly of said half-shells.

* * * * *